US011883334B2

(12) United States Patent
Derenne et al.

(10) Patent No.: US 11,883,334 B2
(45) Date of Patent: Jan. 30, 2024

(54) DEPLOYMENT PATIENT TRANSPORT APPARATUS WITH CONTROLLED AUXILIARY WHEEL DEPLOYMENT

(71) Applicant: Stryker Corporation, Kalamazoo, MI (US)

(72) Inventors: Richard A. Derenne, Portage, MI (US); Gary L. Bartley, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/952,576

(22) Filed: Sep. 26, 2022

(65) Prior Publication Data

US 2023/0017730 A1 Jan. 19, 2023

Related U.S. Application Data

(63) Continuation of application No. 16/690,217, filed on Nov. 21, 2019, now Pat. No. 11,484,447.

(60) Provisional application No. 62/770,458, filed on Nov. 21, 2018.

(51) Int. Cl.
*A61G 1/02* (2006.01)
*A61G 7/05* (2006.01)

(52) U.S. Cl.
CPC ......... *A61G 1/0268* (2013.01); *A61G 1/0237* (2013.01); *A61G 7/05* (2013.01)

(58) Field of Classification Search
CPC .......... A61G 1/00; A61G 1/02; A61G 1/0268; A61G 1/0237; A61G 7/05; A61G 7/08
See application file for complete search history.

(56) References Cited

U.S. PATENT DOCUMENTS

| | | | |
|---|---|---|---|
| 5,348,326 | A | 9/1994 | Fullenkamp et al. |
| 5,806,111 | A | 9/1998 | Heimbrock et al. |
| 5,987,671 | A | 11/1999 | Heimbrock et al. |
| 6,016,580 | A | 1/2000 | Heimbrock et al. |
| 6,178,575 | B1 | 1/2001 | Harada |

(Continued)

FOREIGN PATENT DOCUMENTS

| | | | |
|---|---|---|---|
| WO | 2005041837 | A2 | 5/2005 |
| WO | 2016196403 | A1 | 12/2016 |

(Continued)

*Primary Examiner* — Fredrick C Conley
(74) *Attorney, Agent, or Firm* — Howard & Howard Attorneys PLLC

(57) ABSTRACT

A patient transport apparatus transports a patient over a floor surface. The patient transport apparatus comprises a support structure and support wheels coupled to the support structure. An auxiliary wheel is coupled to the support frame to influence motion of the patient transport apparatus over a floor surface. The auxiliary wheel is movable to a deployed position with the auxiliary wheel engaging the floor surface and a stowed position with the auxiliary wheel spaced a distance from the floor surface. An actuator assembly coupled to the support frame and to the auxiliary wheel. The actuator assembly includes a lift actuator and a spring cartridge assembly. The lift actuator is operable to move the auxiliary wheel to the deployed position and to the stowed position. The spring cartridge assembly is configured to bias the auxiliary wheel towards the deployed position.

19 Claims, 10 Drawing Sheets

(56) References Cited

U.S. PATENT DOCUMENTS

| | | | |
|---|---|---|---|
| 6,286,165 | B1 | 9/2001 | Heimbrock et al. |
| 6,330,926 | B1 | 12/2001 | Heimbrock et al. |
| 6,505,359 | B2 | 1/2003 | Heimbrock et al. |
| 6,588,523 | B2 | 7/2003 | Heimbrock et al. |
| 6,598,247 | B1 | 7/2003 | Heimbrock et al. |
| 6,668,402 | B2 | 12/2003 | Heimbrock |
| 6,749,034 | B2 | 6/2004 | Vogel et al. |
| 6,752,224 | B2 | 6/2004 | Hopper et al. |
| 6,772,460 | B2 | 8/2004 | Heimbrock et al. |
| 6,792,630 | B1 | 9/2004 | Palmatier |
| 6,877,572 | B2 | 4/2005 | Vogel et al. |
| 6,902,019 | B2 | 6/2005 | Heimbrock et al. |
| 7,011,172 | B2 | 3/2006 | Heimbrock et al. |
| 7,014,000 | B2 | 3/2006 | Kummer et al. |
| 7,083,012 | B2 | 8/2006 | Vogel et al. |
| 7,090,041 | B2 | 8/2006 | Vogel et al. |
| 7,195,253 | B2 | 3/2007 | Vogel et al. |
| 7,273,115 | B2 | 9/2007 | Kummer et al. |
| 7,284,626 | B2 | 10/2007 | Heimbrock et al. |
| 7,302,717 | B2 | 12/2007 | Reinke et al. |
| 7,407,024 | B2 | 8/2008 | Vogel et al. |
| 7,419,019 | B1 | 9/2008 | White et al. |
| 7,530,412 | B2 | 5/2009 | Heimbrock et al. |
| 7,828,092 | B2 | 11/2010 | Vogel et al. |
| 7,882,582 | B2 | 2/2011 | Kappeler et al. |
| 7,886,377 | B2 | 2/2011 | Hamberg et al. |
| 7,896,118 | B2 | 3/2011 | Williamson et al. |
| 7,953,537 | B2 | 5/2011 | Bhai |
| 8,051,931 | B2 | 11/2011 | Vogel et al. |
| 8,109,525 | B2 | 2/2012 | Salus |
| 8,122,535 | B2 | 2/2012 | Hensley et al. |
| 8,240,410 | B2 | 8/2012 | Heimbrock et al. |
| 8,260,517 | B2 | 9/2012 | Bhai |
| 8,267,206 | B2 | 9/2012 | Vogel et al. |
| 8,397,846 | B2 | 3/2013 | Heimbrock et al. |
| 8,474,073 | B2 | 7/2013 | Hamberg et al. |
| 8,746,710 | B2 | 6/2014 | Schejbal |
| 8,756,726 | B2 | 6/2014 | Hamberg et al. |
| 8,757,308 | B2 | 6/2014 | Bhai et al. |
| 8,781,677 | B2 | 7/2014 | Roberts et al. |
| 8,978,795 | B2 | 3/2015 | Block et al. |
| 9,271,887 | B2 | 3/2016 | Schejbal |
| 9,358,169 | B2 | 6/2016 | Ottenweller et al. |
| 9,707,143 | B2 | 7/2017 | Thodupunuri et al. |
| 9,931,259 | B2 | 4/2018 | Ottenweller et al. |
| 9,937,943 | B2 | 4/2018 | Nilsson et al. |
| 2003/0159861 | A1 | 8/2003 | Hopper et al. |
| 2005/0126835 | A1 | 6/2005 | Lenkman |
| 2006/0059623 | A1 | 3/2006 | Karmer et al. |
| 2007/0245488 | A1 | 10/2007 | Zimbalista et al. |
| 2010/0181122 | A1 | 7/2010 | Block et al. |
| 2011/0277241 | A1* | 11/2011 | Schejbal ................ A61G 7/018 5/510 |
| 2013/0282234 | A1* | 10/2013 | Roberts .................... A61G 7/08 280/80.1 |
| 2014/0230149 | A1* | 8/2014 | Schejbal .............. A61G 7/0528 5/510 |
| 2016/0136023 | A1 | 5/2016 | Johnson et al. |
| 2016/0137216 | A1 | 5/2016 | Nilsson et al. |
| 2016/0143796 | A1 | 5/2016 | Jordan et al. |
| 2016/0242978 | A1 | 8/2016 | Jurka |
| 2018/0168897 | A1 | 6/2018 | Jonsson |
| 2018/0185208 | A1 | 7/2018 | Jonsson et al. |
| 2019/0201255 | A1 | 7/2019 | Paul et al. |
| 2020/0155383 | A1 | 5/2020 | Derenne et al. |
| 2020/0155384 | A1* | 5/2020 | Derenne ............... B60B 33/066 |

FOREIGN PATENT DOCUMENTS

| | | | |
|---|---|---|---|
| WO | 2017001497 | A1 | 1/2017 |
| WO | 2017151817 | A1 | 9/2017 |
| WO | 2018210626 | A1 | 11/2018 |

* cited by examiner

DEPLOYMENT PATIENT TRANSPORT APPARATUS WITH CONTROLLED AUXILIARY WHEEL DEPLOYMENT

CROSS-REFERENCE TO RELATED APPLICATIONS

The subject patent application is a Continuation of U.S. patent application Ser. No. 16/690,217, filed on Nov. 21, 2019, which claims priority to and all the benefits of U.S. Provisional Patent Application No. 62/770,458, filed on Nov. 21, 2018, the disclosures of each of which are hereby incorporated by reference in their entirety.

BACKGROUND

Patient transport systems facilitate care of patients in a health care setting. Patient transport systems comprise patient transport apparatuses such as, for example, hospital beds, stretchers, cots, tables, wheelchairs, and chairs to move patients between locations. A conventional patient transport apparatus comprises a base, a patient support surface, and several support wheels, such as four swiveling caster wheels. Often, the patient transport apparatus has one or more non-swiveling auxiliary wheels, in addition to the four caster wheels. The auxiliary wheel, by virtue of its non-swiveling nature, is employed to help control movement of the patient transport apparatus over a floor surface in certain situations.

When a caregiver wishes to use the auxiliary wheel to help control movement of the patient transport apparatus, such as down long hallways or around corners, the caregiver selectively moves the auxiliary wheel from a stowed position, out of contact with the floor surface, to a deployed position in contact with the floor surface. In many cases, however, as the patient transport apparatus travels over an uneven floor surface, the auxiliary wheel is unable to make sufficient adjustments in its vertical position to address peaks and valleys in the floor surface. This may result in a loss of traction between the auxiliary wheel and the floor surface as the patient transport apparatus transitions from a flat surface to a declined surface, or an abrupt transfer of force from the auxiliary wheel to the patient transport apparatus as the patient transport apparatus transitions from a flat surface to an inclined surface. Thus, the caregiver must remember to adjust the speed of travel of the patient transport apparatus when traveling over uneven floor surfaces.

A patient transport apparatus designed to overcome one or more of the aforementioned challenges is desired.

DETAILED DESCRIPTION OF THE EMBODIMENTS

Figure 1:
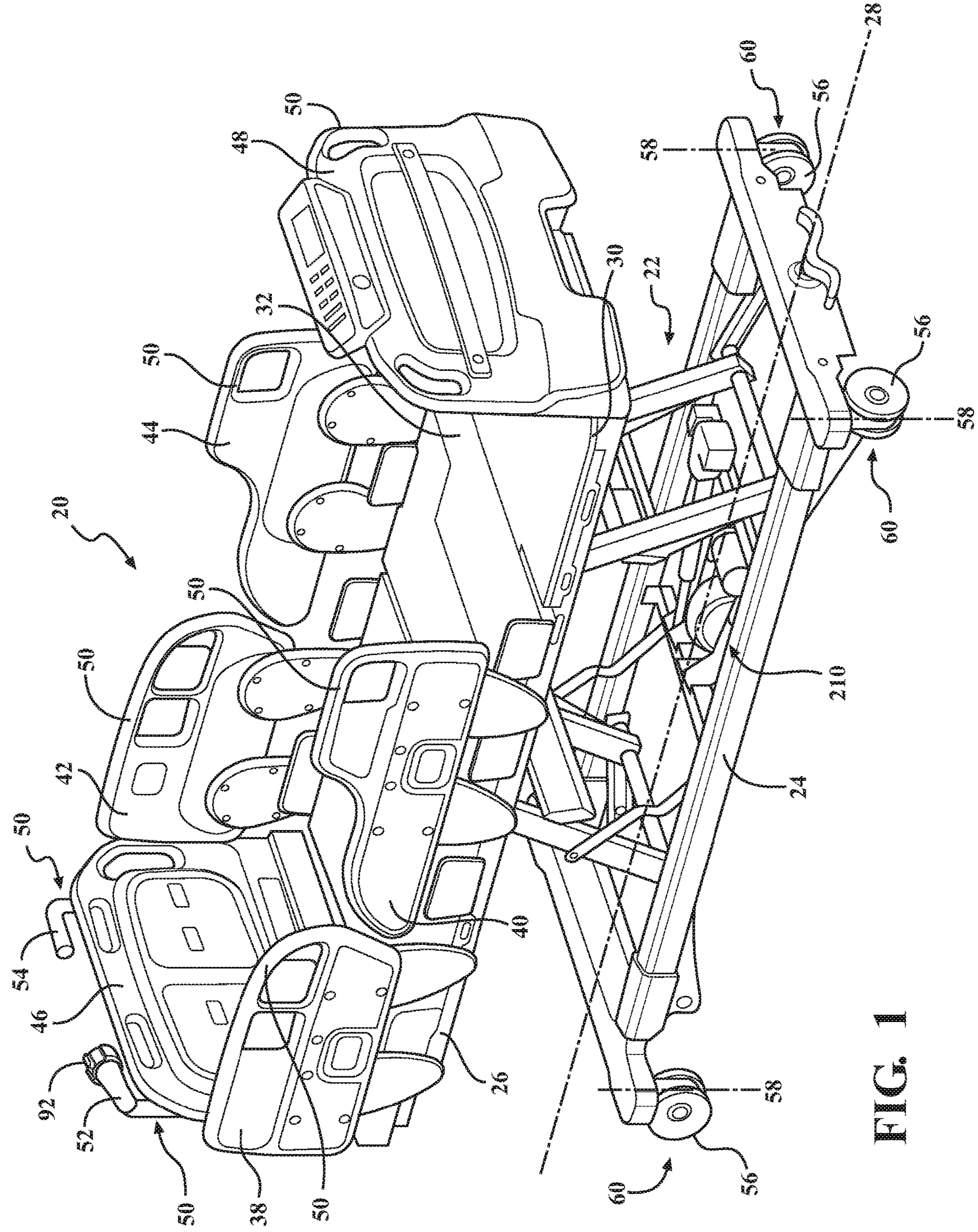
FIG. 1 is a perspective view of a patient transport apparatus.

Referring to FIG. 1, a patient transport system comprising a patient transport apparatus 20 is shown for supporting a patient in a health care setting. The patient transport apparatus 20 illustrated in FIG. 1 comprises a hospital bed. In other embodiments, however, the patient transport apparatus 20 may comprise a cot, table, wheelchair, chair, or similar apparatus, utilized in the care of a patient to transport the patient between locations.

A support structure 22 provides support for the patient. The support structure 22 illustrated in FIG. 1 comprises a base 24 and an intermediate frame 26. The base 24 defines a longitudinal axis 28 from a head end to a foot end. The intermediate frame 26 is spaced above the base 24. The support structure 22 also comprises a patient support deck 30 disposed on the intermediate frame 26. The patient support deck 30 comprises several sections, some of which articulate (e.g., pivot) relative to the intermediate frame 26, such as a fowler section, a seat section, a thigh section, and a foot section. The patient support deck 30 provides a patient support surface 32 upon which the patient is supported.

A mattress, although not shown, may be disposed on the patient support deck 30. The mattress comprises a secondary patient support surface upon which the patient is supported. The base 24, intermediate frame 26, patient support deck 30, and patient support surface 32 each have a head end and a foot end corresponding to designated placement of the patient's head and feet on the patient transport apparatus 20. The construction of the support structure 22 may take on any known or conventional design, and is not limited to that specifically set forth above. In addition, the mattress may be omitted in certain embodiments, such that the patient rests directly on the patient support surface 32.

Side rails 38, 40, 42, 44 are supported by the base 24. A first side rail 38 is positioned at a right head end of the intermediate frame 26. A second side rail 40 is positioned at a right foot end of the intermediate frame 26. A third side rail 42 is positioned at a left head end of the intermediate frame 26. A fourth side rail 44 is positioned at a left foot end of the intermediate frame 26. If the patient transport apparatus 20 is a stretcher, there may be fewer side rails. The side rails 38, 40, 42, 44 are movable between a raised position in which they block ingress and egress into and out of the patient transport apparatus 20 and a lowered position in which they are not an obstacle to such ingress and egress. The side rails 38, 40, 42, 44 may also be movable to one or more intermediate positions between the raised position and the lowered position. In still other configurations, the patient transport apparatus 20 may not comprise any side rails.

A headboard 46 and a footboard 48 are coupled to the intermediate frame 26. In other embodiments, when the headboard 46 and footboard 48 are provided, the headboard 46 and footboard 48 may be coupled to other locations on the patient transport apparatus 20, such as the base 24. In still other embodiments, the patient transport apparatus 20 does not comprise the headboard 46 and/or the footboard 48.

User interfaces 50, such as handles, are shown integrated into the footboard 48 and side rails 38, 40, 42, 44 to facilitate movement of the patient transport apparatus 20 over floor surfaces. Additional user interfaces 50 may be integrated into the headboard 46 and/or other components of the patient transport apparatus 20. The user interfaces 50 are graspable by the user to manipulate the patient transport apparatus 20 for movement.

Other forms of the user interface 50 are also contemplated. The user interface 50 may simply be a surface on the patient transport apparatus 20 upon which the user logically applies force to cause movement of the patient transport apparatus 20 in one or more directions, also referred to as a push location. This may comprise one or more surfaces on the intermediate frame 26 or base 24. This could also comprise one or more surfaces on or adjacent to the headboard 46, footboard 48, and/or side rails 38, 40, 42, 44.

In the embodiments shown, one set of user interfaces 50 comprises a first handle 52 and a second handle 54. The first and second handles 52, 54 are coupled to the intermediate frame 26 proximal to the head end of the intermediate frame 26 and on opposite sides of the intermediate frame 26 so that the user may grasp the first handle 52 with one hand and the second handle 54 with the other. In other embodiments, the user interfaces 50 comprise one or more of a joystick, dial, or knob in place of the first and second handles 52, 54.

Figure 2:
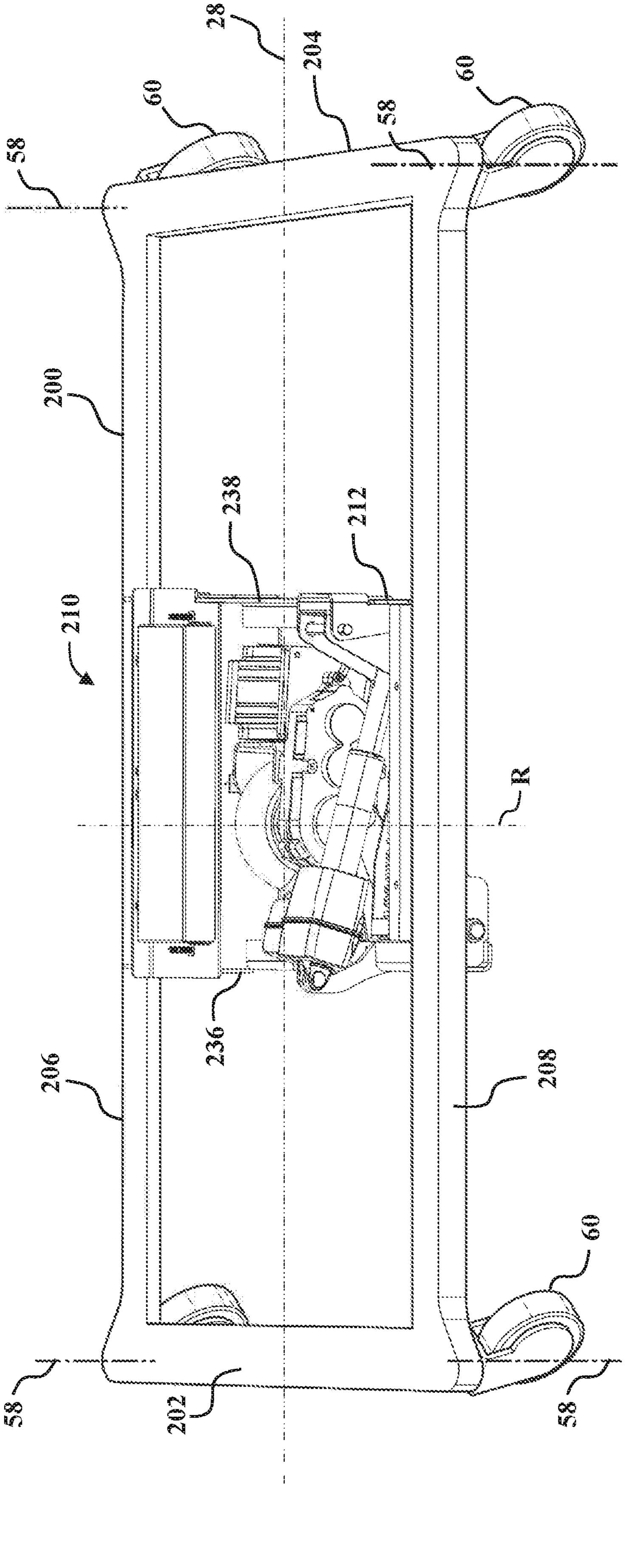
FIG. 2 is a perspective view of an auxiliary wheel assembly of the patient transport apparatus coupled to a base of the patient transport apparatus.

Support wheels 56 are coupled to the base 24 to support the base 24 on a floor surface such as a hospital floor. The support wheels 56 allow the patient transport apparatus 20 to move in any direction along the floor surface by swiveling to assume a trailing orientation relative to a desired direction of movement. In the embodiments shown, the support wheels 56 comprise four support wheels each arranged in corners of the base 24. The support wheels 56 shown are caster wheels able to rotate and swivel about swivel axes 58 during transport. Each of the support wheels 56 forms part of a caster assembly 60. Each caster assembly 60 is mounted to the base 24. It should be understood that various configurations of the caster assemblies 60 are contemplated. In addition, in some embodiments, the support wheels 56 are not caster wheels and may be non-steerable, steerable, non-powered, powered, or combinations thereof. Additional support wheels 56 are also contemplated. Referring to FIG. 2, in the embodiments shown, the base 24 includes a support assembly 200 that includes a forward support member 202, a rear support member 204, and a pair of opposing side support members 206, 208. The side support members 206, 208 extend between the forward support member 202 and the rear support member 204 and are orientated parallel to the longitudinal axis 28.

Referring to FIGS. 2-10C, an auxiliary wheel system 210 is coupled to the base 24. The auxiliary wheel system 210 influences motion of the patient transport apparatus 20 during transportation over the floor surface.

Figure 3:
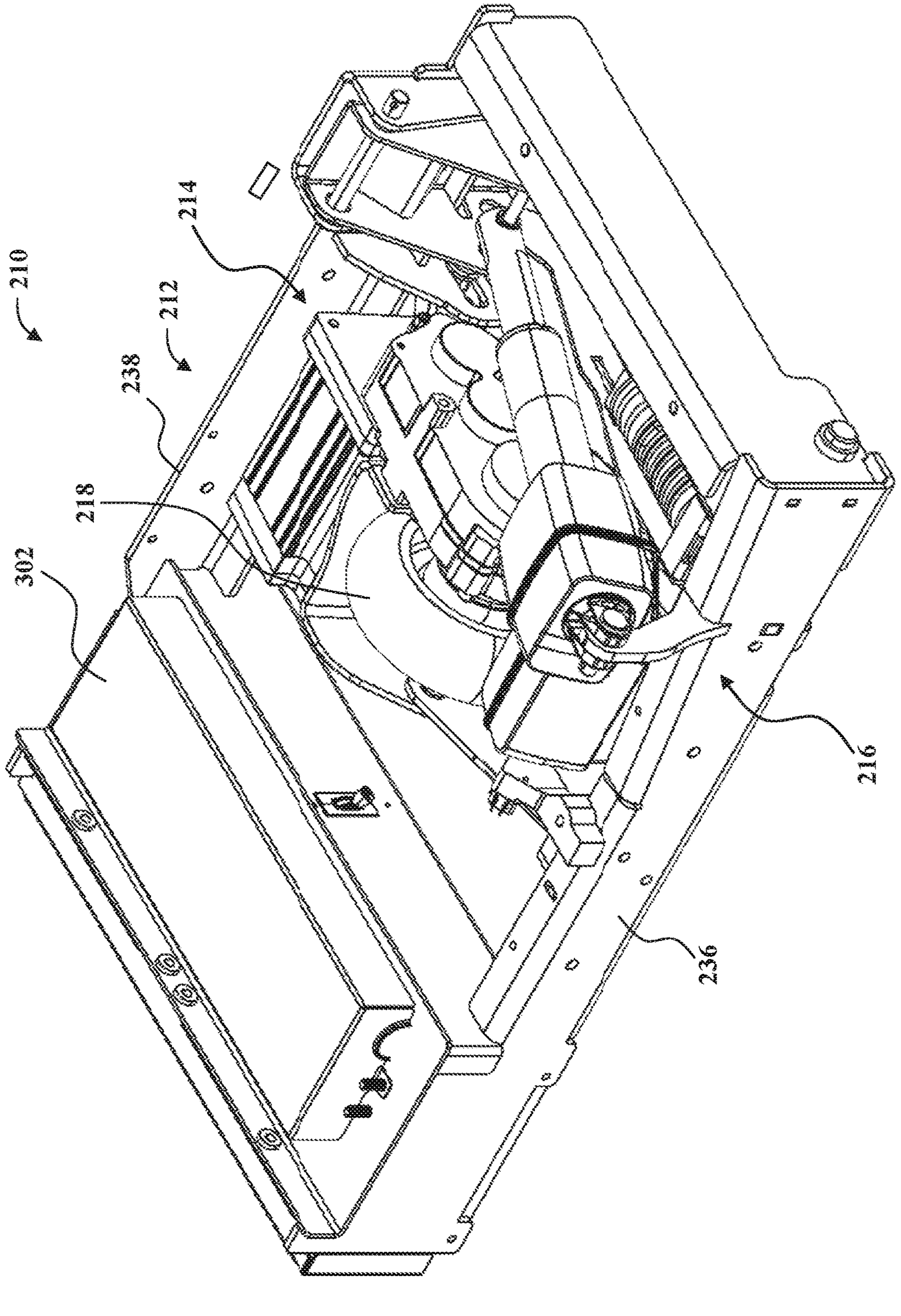
FIG. 3 is a perspective view of the auxiliary wheel assembly comprising an auxiliary wheel, a lift actuator, and a spring cartridge assembly.
Figure 4:
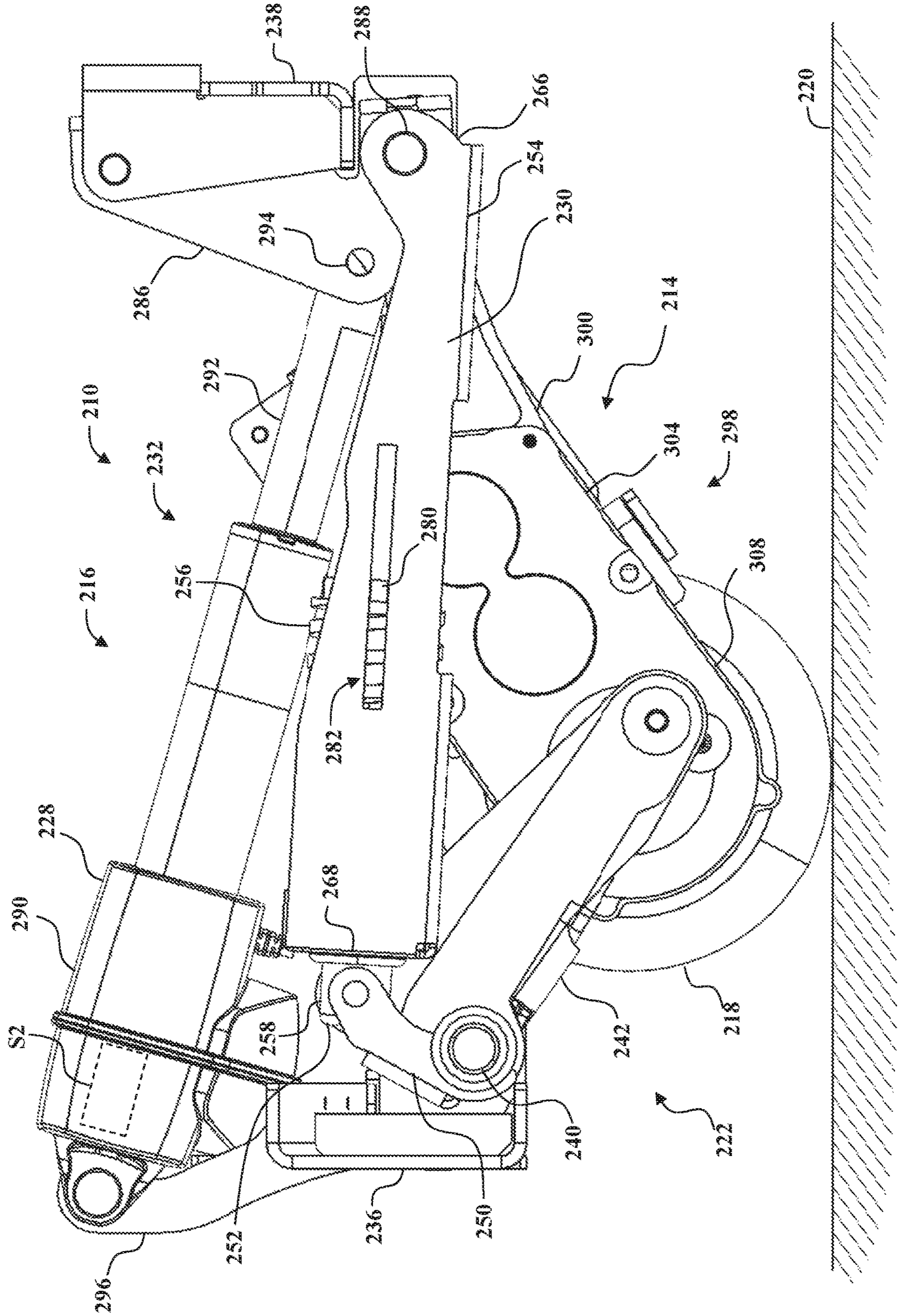
FIG. 4 is an elevation view of the auxiliary wheel assembly shown in FIG. 3.

Referring to FIGS. 2 and 3, the auxiliary wheel system 210 includes a support frame 212 that is coupled to the base 24, an auxiliary wheel assembly 214 that is coupled to the support frame 212 and arranged to articulate (e.g. pivot) with respect to the support frame 212, and an actuator assembly 216 that is coupled the support frame 212 and the auxiliary wheel assembly 214. The auxiliary wheel assembly 214 includes an auxiliary wheel 218 that is configured to influence motion of the patient transport apparatus 20 over a floor surface 220. The auxiliary wheel assembly 214 is positionable to a deployed position 222 (shown in FIG. 9A) with the auxiliary wheel 218 engaging the floor surface 220, and a stowed position 224 (shown in FIG. 9B) with the auxiliary wheel 218 spaced a vertical distance 226 from the floor surface 220. The actuator assembly 216 is coupled to the support frame 212 and to the auxiliary wheel assembly 214.

Referring to FIGS. 4, 5, 6, and 7, the actuator assembly 216 includes a lift actuator 228 and a spring cartridge assembly 230. The lift actuator 228 is operable to move the auxiliary wheel 218 to the deployed position 222 engaging the floor surface and to the stowed position 224 spaced away from and out of contact with the floor surface. The spring cartridge assembly 230 is coupled between the lift actuator 228 and the auxiliary wheel 218, and is configured to transfer a force from the lift actuator 228 to the auxiliary wheel 218 to facilitate moving the auxiliary wheel 218 to the deployed position 222 and to the stowed position 224. In addition, the spring cartridge assembly 230 is configured to bias the auxiliary wheel 218 outwardly from the support frame 212 and towards the deployed position 222, and to allow a vertical movement of auxiliary wheel 218 with respect to the support frame 212 with the auxiliary wheel assembly 214 in the deployed position 222.

Figure 9A:
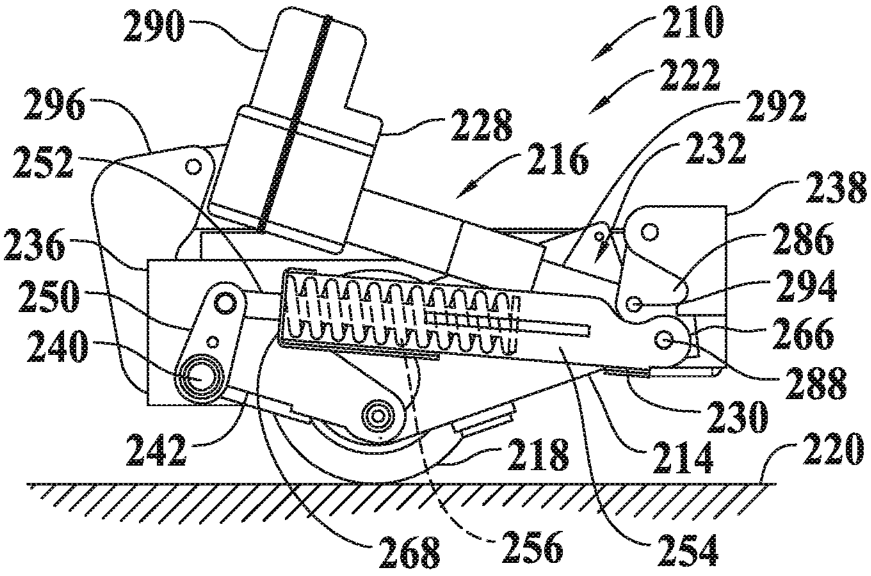
FIG. 9A is an elevation view of the auxiliary wheel assembly in a deployed position.
Figure 9B:
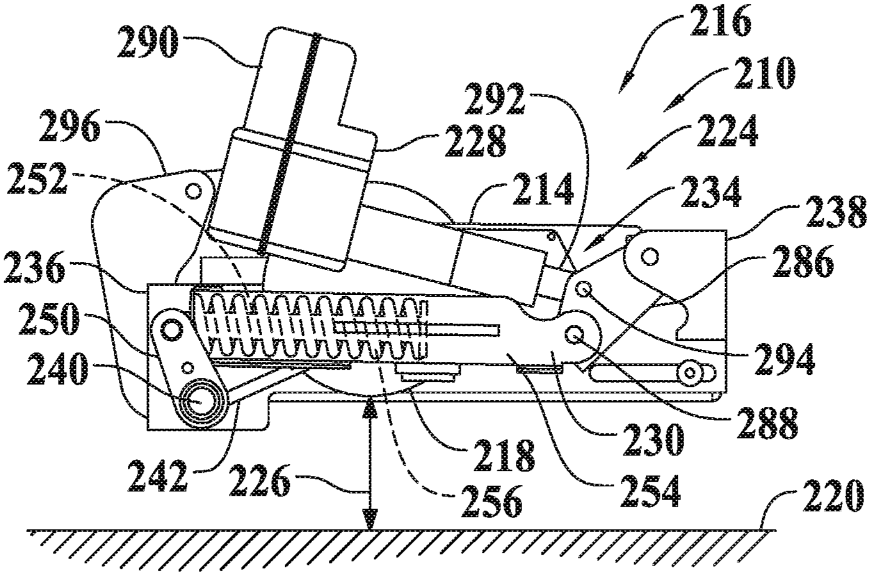
FIG. 9B is an elevation view of the auxiliary wheel assembly in a stowed position.

In the embodiments shown, the lift actuator 228 is positionable between an extended position 232 (shown in FIG. 9A) and a retracted position 234 (shown in FIG. 9B). For example, a movement of the lift actuator 228 towards the extended position 232 causes the spring cartridge assembly 230 to move the auxiliary wheel 218 towards the deployed position 222. A movement of the lift actuator 228 towards the retracted position 234 causes the spring cartridge assembly 230 to move the auxiliary wheel 218 towards the stowed position 224. In addition, the spring cartridge assembly 230 is configured to allow vertical movement of the auxiliary wheel 218 with the lift actuator 228 in the extended position 232.

The auxiliary wheel 218 influences motion of the patient transport apparatus 20 during transportation over the floor surface when the auxiliary wheel 218 is in the deployed position 222. In some embodiments, the auxiliary wheel assembly 214 comprises an additional auxiliary wheel movable with the auxiliary wheel 218 between the deployed position 222 and stowed position 224 via the actuator assembly 216.

By deploying the auxiliary wheel 218 on the floor surface, the patient transport apparatus 20 can be easily moved down long, straight hallways or around corners, owing to a non-swiveling nature of the auxiliary wheel 218. When the auxiliary wheel 218 is stowed (see FIG. 9B), the patient transport apparatus 20 is subject to moving in an undesired direction due to uncontrollable swiveling of the support wheels 56. For instance, during movement down long, straight hallways, the patient transport apparatus 20 may be susceptible to "dog tracking," which refers to undesirable sideways movement of the patient transport apparatus 20. Additionally, when cornering, without the auxiliary wheel 218 deployed, and with all of the support wheels 56 able to swivel, there is no wheel assisting with steering through the corner, unless one or more of the support wheels 56 are provided with steer lock capability and the steer lock is activated.

The auxiliary wheel 218 may be arranged parallel to the longitudinal axis 28 of the base 24. Said differently, the auxiliary wheel 218 rotates about a rotational axis R (see FIG. 2) oriented perpendicularly to the longitudinal axis 28 of the base 24 (albeit offset in some cases from the longitudinal axis 28). In the embodiments shown, the auxiliary wheel 218 is incapable of swiveling about a swivel axis. In other embodiments, the auxiliary wheel 218 may be capable of swiveling, but can be locked in a steer lock position in which the auxiliary wheel 218 is locked to solely rotate about the rotational axis R oriented perpendicularly to the longitudinal axis 28. In still other embodiments, the auxiliary wheel 218 may be able to freely swivel without any steer lock functionality.

The auxiliary wheel 218 may be located to be deployed inside a perimeter of the base 24 and/or within a support wheel perimeter defined by the swivel axes 58 of the support wheels 56. In some embodiments, such as those employing a single auxiliary wheel 218, the auxiliary wheel 218 may be located near a center of the support wheel perimeter, or offset from the center. In this case, the auxiliary wheel 218 may also be referred to as a fifth wheel. In other embodiments, the auxiliary wheel 218 may be disposed along the support wheel perimeter or outside of the support wheel perimeter. In the embodiments shown, the auxiliary wheel 218 has a diameter larger than a diameter of the support wheels 56. In other embodiments, the auxiliary wheel 218 may have the same or a smaller diameter than the support wheels 56.

As the patient transport apparatus 20 travels over an uneven floor surface, the spring cartridge assembly 230 allows the auxiliary wheel 218 to move vertically with respect to base 24, and biases the auxiliary wheel 218 towards the floor surface with sufficient force to maintain traction between the floor surface and the auxiliary wheel 218. In addition, the spring cartridge assembly 230 permits the auxiliary wheel 218 to move upward when encountering a high spot in the floor surface and to dip lower when encountering a low spot in the floor surface.

Figure 10A:
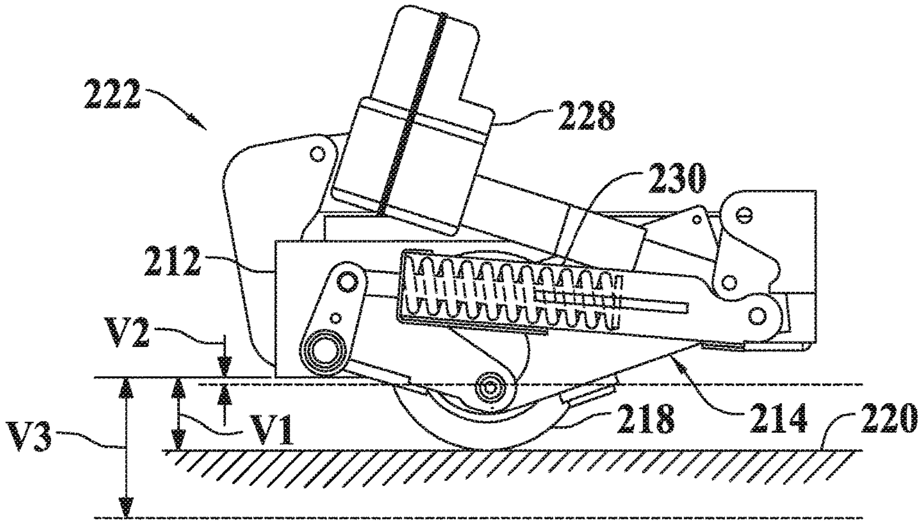
FIGS. 10A-10C are elevation views illustrating a movement of the auxiliary wheel with the auxiliary wheel assembly in the deployed position.
Figure 10B:
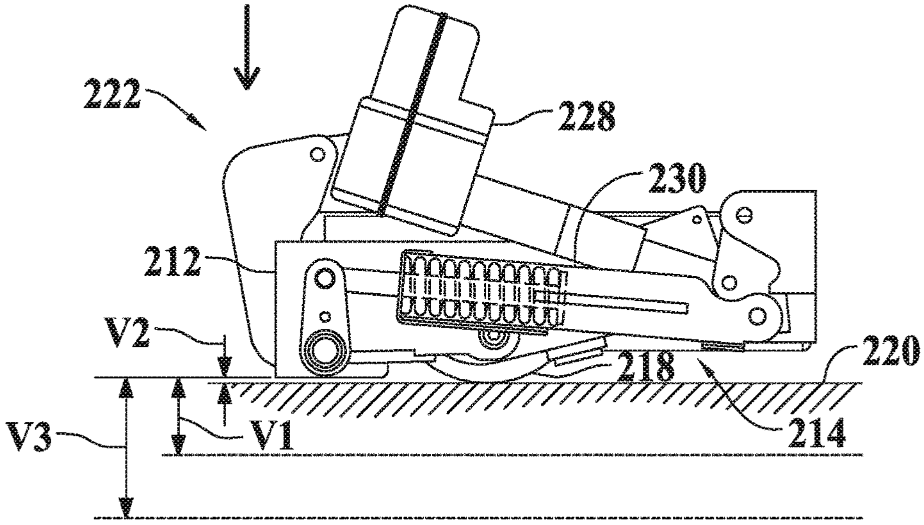
Figure 10C:
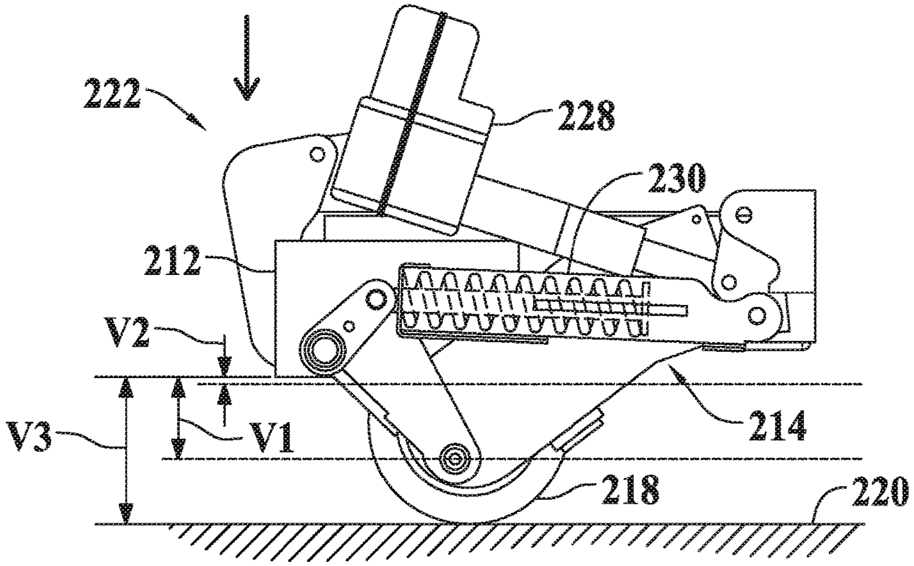

For example, FIGS. 10A-10C illustrate a vertical movement of the auxiliary wheel 218 with the auxiliary wheel assembly 214 in the deployed position 222. With the auxiliary wheel assembly 214 in the deployed position 222, the spring cartridge assembly 230 biases the auxiliary wheel 218 towards the floor surface 220 such that the auxiliary wheel 218 is spaced a first vertical distance, V1, from the support frame 212. In addition, the spring cartridge assembly 230 imparts sufficient downward force to the auxiliary wheel 218 to maintain sufficient traction between the auxiliary wheel 218 and the floor surface 220. During operation, as the patient transport apparatus 20 travels over an inclined floor surface 220 such as, for example, an inclined ramp, the spring cartridge assembly 230 allows the auxiliary wheel 218 to move towards the support frame 212 and to a second vertical distance, V2, from the support frame 212 that is less than the first vertical distance, V1. In addition, as the patient transport apparatus 20 travels over an declining floor surface 220 such as, for example, a trough, the spring cartridge assembly 230 biases the auxiliary wheel 218 away from the support frame 212 and towards a third vertical distance, V3, from the support frame 212 that is greater than the first vertical distance, V1. By enabling the auxiliary wheel 218 to travel vertically with respect to the support frame 212 with the auxiliary wheel assembly 214 in the deployed position 222, the spring cartridge assembly 230 facilitates maintaining sufficient traction between an uneven floor surface 220 and the auxiliary wheel 218 to enable the auxiliary wheel 218 to influence motion of the patient transport apparatus 20 during operation.

Figure 5:
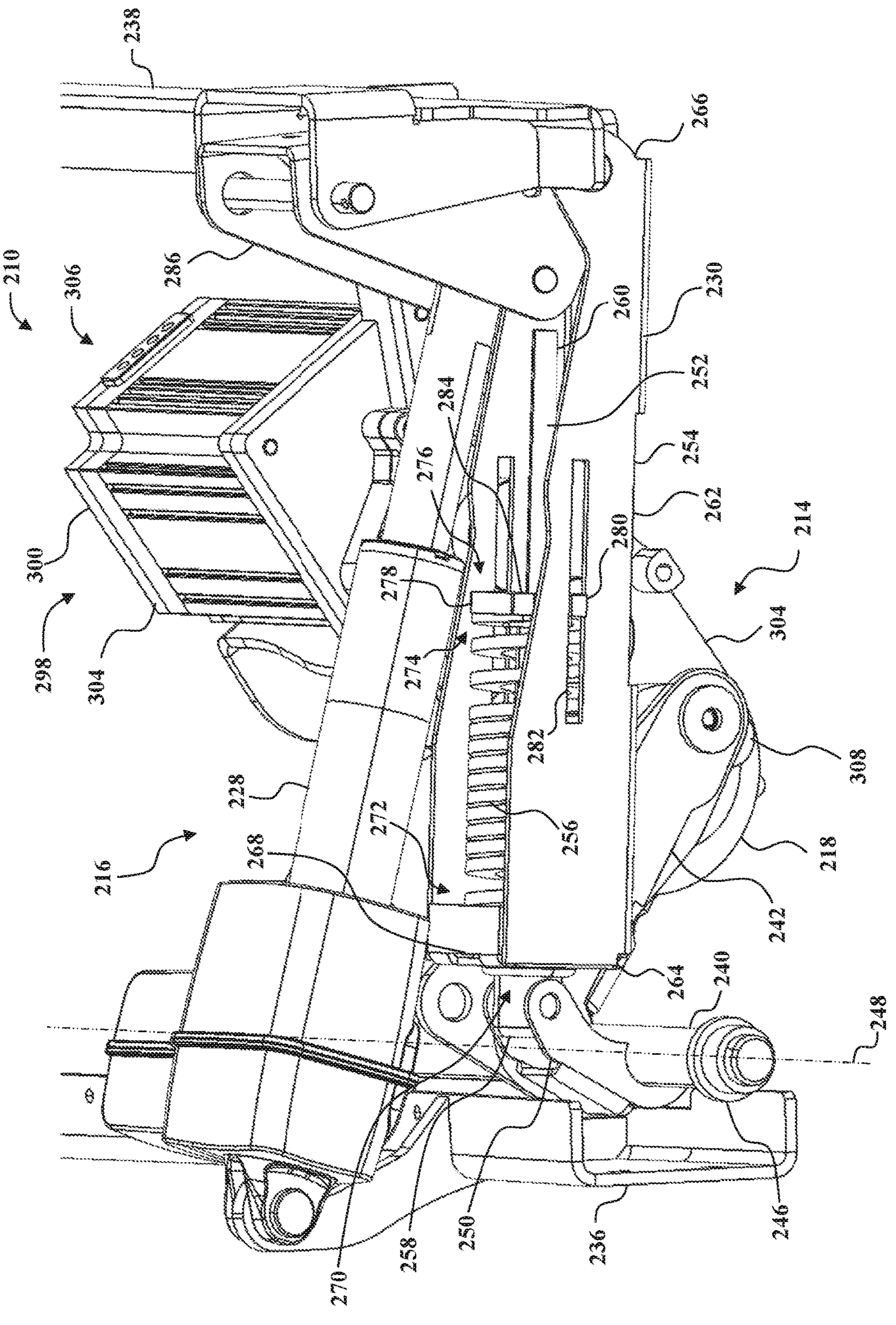
FIG. 5 is a perspective view of a portion of the auxiliary wheel assembly shown in FIG. 3.
Figure 6:
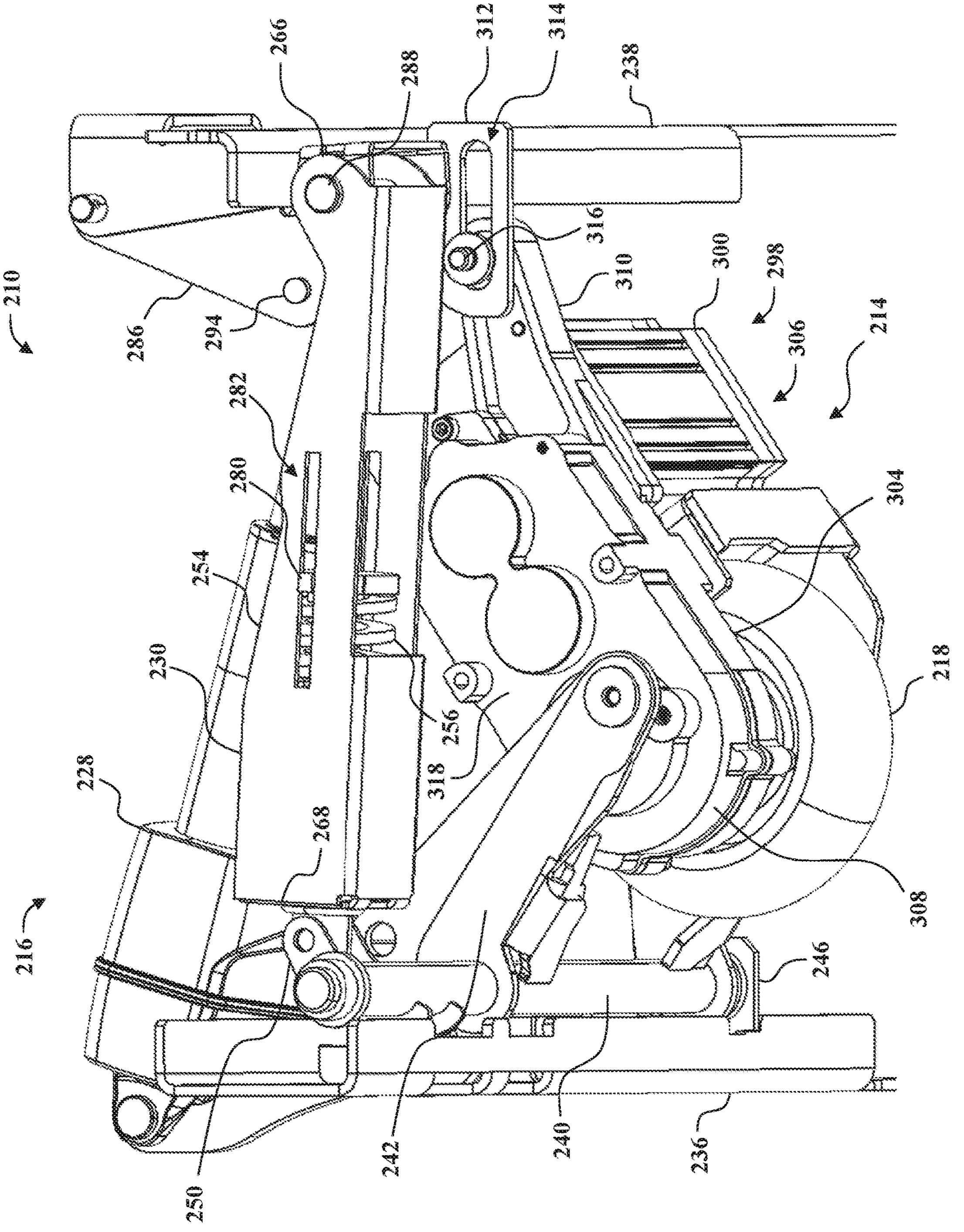
FIG. 6 is another perspective view of a portion the auxiliary wheel assembly shown in FIG. 3.
Figure 7:
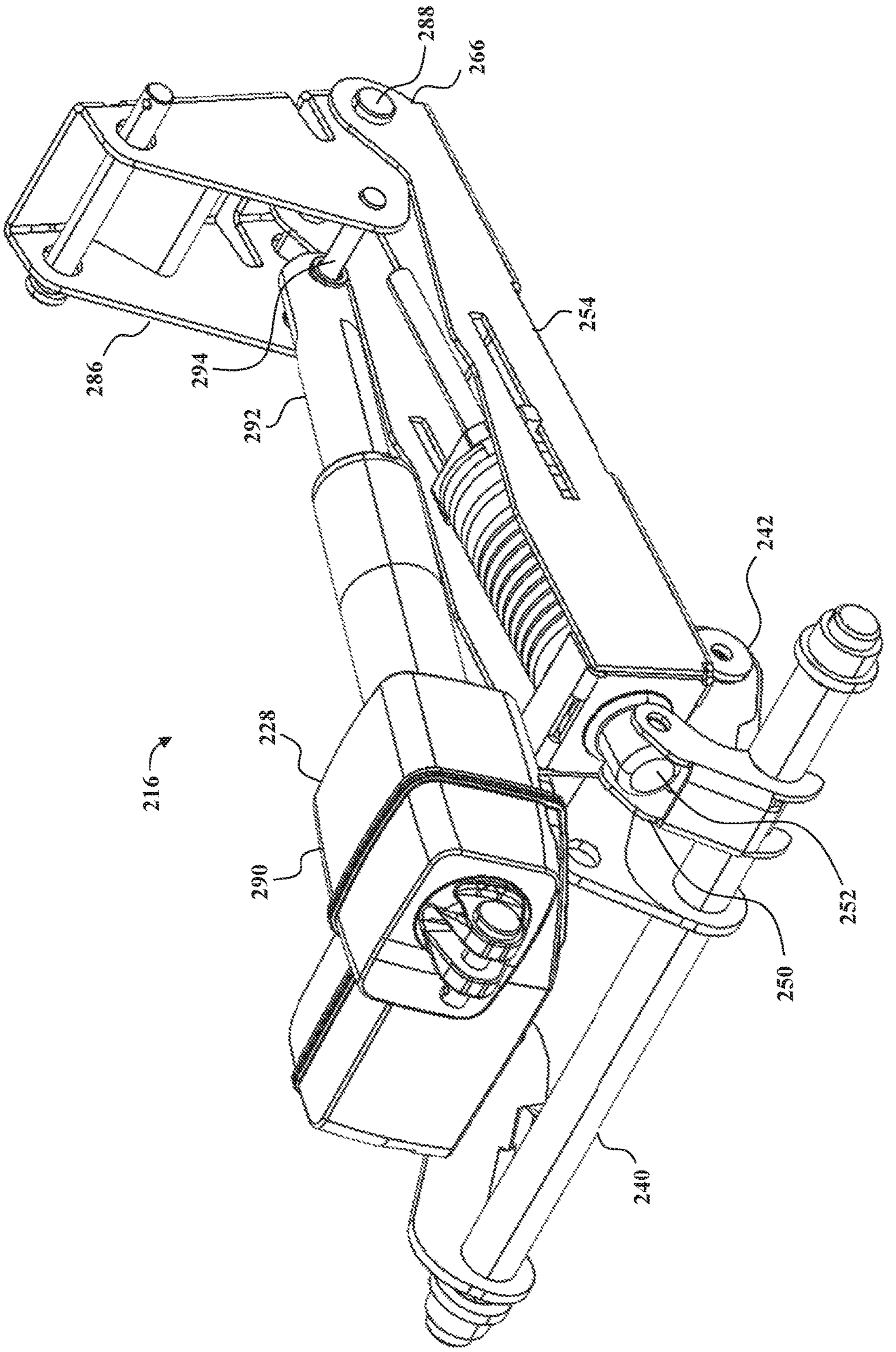
FIG. 7 is a perspective view of the lift actuator assembly that may be used with the auxiliary wheel assembly shown in FIG. 3.
Figure 8A:
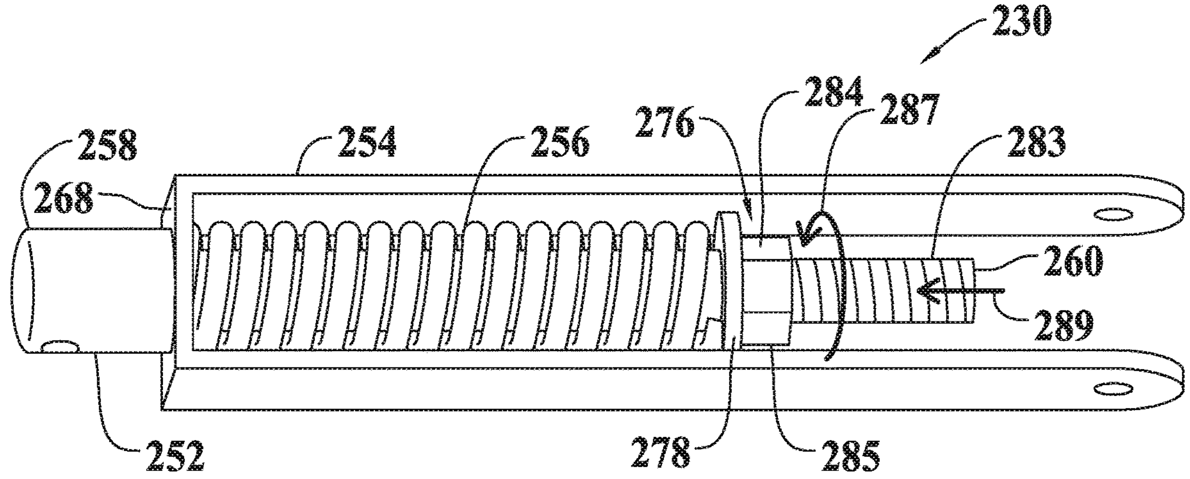
FIGS. 8A and 8B are elevation views of the spring cartridge assembly.
Figure 8B:
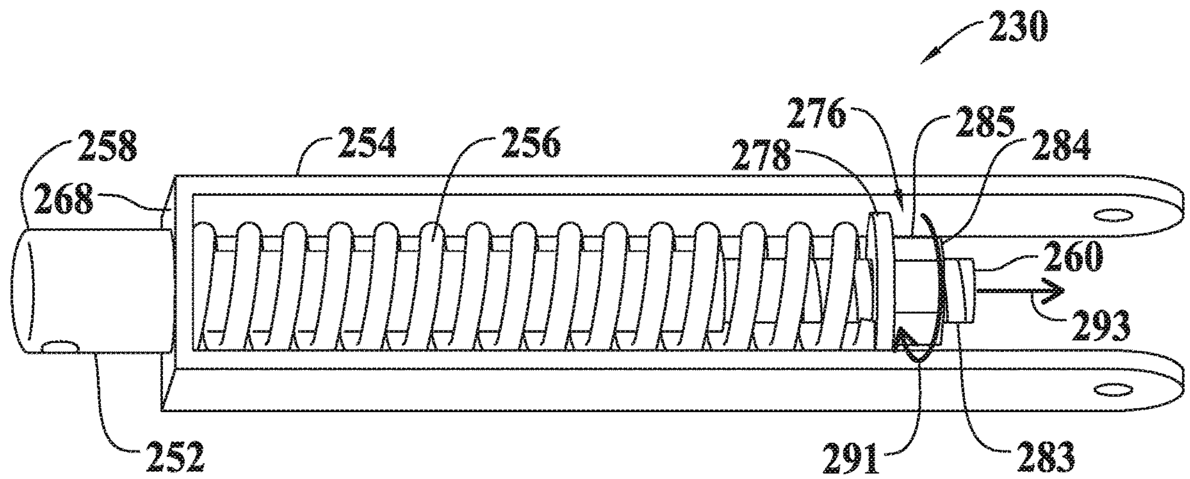

Referring to FIGS. 5, 6, and 7, in the embodiments shown, the support frame 212 includes a first cross-member 236 and a second cross-member 238. The second cross-member 238 is spaced a distance from the first cross-member 236 along the longitudinal axis 28. The first cross-member 236 and the second cross-member 238 are each coupled between the pair of opposing side support members 206, 208.

In the embodiments shown, the auxiliary wheel assembly 214 also includes a crank shaft 240 and a wheel support frame 242. The crank shaft 240 is coupled to the first cross-member 236 with a crank shaft bracket 246 that extends outwardly from an outer surface of the first cross-member 236. The crank shaft 240 extends along a centerline axis 248 and is rotatably coupled to the first cross-member 236 such that the crank shaft 240 is rotatable about the centerline axis 248. The wheel support frame 242 extends radially outwardly from the crank shaft 240 such that a rotation of the crank shaft 240 cause a rotation of the wheel support frame 242 about the centerline axis 248 of the crank shaft 240. The wheel support frame 242 is coupled to the auxiliary wheel 218 such that a rotation of the crank shaft 240 causes a vertical movement of the auxiliary wheel 218. The auxiliary wheel assembly 214 also includes a crank 250 that extends radially outwardly from the crank shaft 240 such that a rotation of the crank 250 causes a rotation of the crank shaft 240 about the centerline axis 248 of the crank shaft 240. The crank 250 is coupled to the spring cartridge assembly 230 such that a movement of spring cartridge assembly 230 via the lift actuator 228 causes a rotation of the crank shaft 240.

The spring cartridge assembly 230 includes a piston rod 252, a cartridge housing 254, and a compression spring 256. The piston rod 252 is pivotably coupled to the crank 250 and the cartridge housing 254 is coupled to the lift actuator 228. The cartridge housing 254 is movable with respect to the piston rod 252. The compression spring 256 acts between the cartridge housing 254 and to the piston rod 252 such that a movement of the cartridge housing 254 causes a movement of the piston rod 252. In addition, a movement of the piston rod 252 causes a movement of the crank 250 which in turn causing a rotation of the crank shaft 240 and wheel support frame 242.

The piston rod 252 extends between a first rod end 258 and a second rod end 260, and is at least partially positioned within the cartridge housing 254. The cartridge housing 254 includes a plurality of sidewalls 262 extending between a first end 264 and a second end 266. A guide plate 268 is coupled to the plurality of sidewalls 262 and is positioned at the first end 264 of the cartridge housing 254. The guide plate 268 includes a rod opening 270 that is defined through the guide plate 268. The rod opening 270 is sized and shaped to receive the piston rod 252 therethrough. The second rod end 260 extends through the rod opening 270. The first rod end 258 is located at an enlarged head of the piston rod 252 that is sized larger than the rod opening 270 so that the guide plate 268 is able to abut the enlarged head when stowing the auxiliary wheel 218. The enlarged head is pivotably coupled to the crank 250 via a fastening pin extending through the enlarged head and the crank 250. The second rod end 260 is positioned with the cartridge housing 254 and extends toward the second end 266 of the cartridge housing 254. The second rod end 260 is considered a free end, unconnected to any other structure.

The compression spring 256 extends between a first end 272 and a second end 274 and is positioned with the cartridge housing 254 such that the compression spring 256 surrounds a portion of the piston rod 252. The compression spring 256 is configured to bias the cartridge housing 254 towards the first rod end 258. The first end 272 of the compression spring 256 engages the guide plate 268 of the cartridge housing 254 and the second end 274 of the compression spring 256 acts against the piston rod 252 via a guide assembly 276 described below.

In the embodiments shown, the spring cartridge assembly 230 includes the guide assembly 276 that is coupled to the piston rod 252 and engages the compression spring 256. The guide assembly 276 includes a guide ring 278 that is coupled to the piston rod 252 and engages the compression spring 256. The guide ring 278 includes a pair of opposing positioning flanges 280 that extend outwardly from an outer surface of the guide ring 278. Each sidewall 262 of the cartridge housing 254 includes a guide slot 282 that extends through the sidewall 262. Each positioning flange 280 is inserted through a corresponding guide slot 282 to support the piston rod 252 from the cartridge housing 254. Each positioning flange 280 is slideably engaged within the guide slot 282 to enable the cartridge housing 254 to move with respect to the piston rod 252. In addition, the guide slots 282 are sized and shaped to allow a movement of the piston rod 252 with respect to the cartridge housing 254 with the lift actuator 228 in the extended position 232. For example, the guide slot 282 includes a length that enables the guide ring 278 to slide along a length of the guide slot 282 to enable the piston rod 252 to translate relative to the cartridge housing 254.

In some embodiments, the guide assembly 276 includes a biasing load adjustment assembly 284 for adjusting a load imparted by the compression spring 256. In the illustrated embodiment, the biasing load adjustment assembly 284 includes an adjustment member 285 (see FIGS. 8A and 8B) that is coupled to the piston rod 252 and engages the guide ring 278 for adjusting an operating length of the compression spring 256 to adjust a load imparted by the compression spring 256 onto the piston rod 252 and cartridge housing 254. In addition, the biasing load adjustment assembly 284 enables a service technician to release the tension of the compression spring 256 thereby removing the biasing force on the auxiliary wheel 218 to enable the service technician to safely service the actuator assembly 216.

For example, the piston rod 252 may include an outer surface having a threaded portion 283. The adjustment member 285 may comprise a tensioning nut, threadably coupled to piston rod 252 along the threaded portion 283 such that a rotation of the tensioning nut with respect to the piston rod 252 adjusts the length of the compression spring 256. For example, a rotation of the tensioning nut in a first rotational direction 287 moves the tensioning nut 285 and the guide ring 278 along the piston rod 252 in a first linear direction 289 that decreases the length of the compression spring 256 to preload a compressive force onto the compression spring 256. A rotation of the tensioning nut 285 in a second opposite rotational direction 291 moves the tensioning nut 285 and the guide ring 278 along the piston rod 252 in a second linear direction 293 that increases the length of the compression spring 256 to reduce the compressive force of the compression spring 256. In addition, during normal operation, the compression spring 256 is in compression in all positions. In order to service the actuator assembly 216, the service technician may remove the compression on the compression spring 256 by loosening the tensioning nut 285, thereby allowing the service technician to safely remove the crank 240 pin and service the actuator assembly 216.

Referring to FIGS. 9A and 9B, the actuator assembly 216 includes an actuator support bracket 286 that is hingedly coupled to the second cross-member 238. The cartridge housing 254 is pivotably coupled to the actuator support bracket 286 via a fastening pin 288 inserted through the second end 266 of the cartridge housing 254 and the actuator support bracket 286. The lift actuator 228 is coupled to the actuator support bracket 286 such that a movement of the lift actuator 228 causes a movement of the actuator support bracket 286 and the cartridge housing 254.

In the embodiments shown, the lift actuator 228 is a linear actuator that includes an actuator housing 290 and an actuator rod 292. The actuator rod 292 has a proximal end received in the actuator housing 290 and a distal end spaced from the actuator housing 290. The distal end of the actuator rod 292 is configured to be movable relative to the actuator housing 290 to extend and retract an overall length of the lift actuator 228. The actuator rod 292 is movable between the extended position 232 (shown in FIG. 9A) with the actuator rod 292 extending outwardly from the actuator housing a first distance, and the retracted position 234 (shown in FIG. 9B) with the actuator rod 292 extending outwardly from the actuator housing a second distance that is longer than the first distance. The actuator housing 290 is coupled to the first cross-member 236. The actuator rod 292 is pivotably coupled to the actuator support bracket 286 with a fastening pin 294. The support frame 212 includes an actuator support arm 296 that extends outwardly from the first cross-member 236. The actuator support arm 296 is coupled to the actuator housing 290 to support the actuator housing 290 from the first cross-member 236.

In the embodiments shown, the auxiliary wheel assembly 214 also includes an auxiliary wheel drive system 298 (see FIG. 5) operatively coupled to the auxiliary wheel 218. The auxiliary wheel drive system 298 is configured to drive (e.g. rotate) the auxiliary wheel 218. In the embodiment shown, the auxiliary wheel drive system 298 includes a motor assembly 300 coupled to a power source 302 such as, for example, a battery for providing electrical power to energize the motor assembly 300. The motor assembly 300 that is coupled to the auxiliary wheel 218 for rotating the auxiliary wheel 218 about the rotational axis R. The motor assembly 300 includes a motor assembly housing 304 and a motor 306 positioned within the motor assembly housing 304. The motor 306 is coupled to the auxiliary wheel 218 for providing motive power to the auxiliary wheel 218. The motor assembly housing 304 includes a body (also referred to as a link) that extends between a first housing end 308 and a second housing end 310 (see FIG. 6). The first housing end 308 is pivotably coupled to the wheel support frame 242 via a fastener such that a rotation of the crank shaft 240 causes a vertical movement of the motor assembly housing 304 and the auxiliary wheel 218. The second housing end 310 is pivotably coupled to the second cross-member 238.

Referring to FIG. 6, the support frame 212 includes a motor assembly support bracket 312 that extends outwardly from the second cross-member 238. The motor assembly support bracket 312 is coupled to the motor assembly housing 304 to support the motor assembly housing 304 from the second cross-member 238. The motor assembly support bracket 312 includes a translation slot 314 that extends through an outer surface of the motor assembly support bracket 312. The motor assembly housing 304 is pivotably and moveably coupled to the motor assembly support bracket 312 with a fastening pin 316 that extends outwardly from the motor assembly housing 304 and through the translation slot 314. The motor assembly housing 304 is configured to articulate and translate relative to the second cross-member 238. The translation slot 314 is sized and shaped to enable the fastening pin 316 to slide along a length of the translation slot 314 to enable the motor assembly housing 304 to translate relative to the motor assembly support bracket 312.

In some embodiments, the motor assembly 300 includes a gear train assembly 318 that is coupled to the motor 306 and the auxiliary wheel 218 for transferring torque from the motor 306 to the auxiliary wheel 218. The gear train assembly 318 may also be positioned within motor assembly housing 304.

In the embodiments shown, referring back to FIG. 9A, during operation, as the lift actuator 228 moves to the extended position, the actuator rod 292 causes the actuator support bracket 286 to pivot toward the second cross-member 238 which causes the cartridge housing 254 to move towards the second cross-member 238 and away from the crank shaft 240. As the cartridge housing 254 moves toward the second cross-member 238, the guide plate 268 engages and compresses the compression spring 256 which, in turn, pushes the piston rod 252 toward the second cross-member 238. As the piston rod 252 moves toward the second cross-member 238, the piston rod 252 causes the crank 250 to rotate the crank shaft 240 and the wheel support frame 242 in a first rotational direction. The rotation of the wheel support frame 242 causes the motor assembly housing 304 and the auxiliary wheel 218 to move away from the support frame 212 to the deployed position 222. In the deployed position 222, the lift actuator 228 is in the extended position 232 and an outer surface of the actuator support bracket 286 contacts the second cross-member 238 to prevent further extension of the actuator rod 292. In addition, referring back to FIG. 6, as the motor assembly housing 304 moves away from the support frame 212, the fastening pin 316 slides along the translation slot 314 to enable the motor assembly housing 304 to pivot and translate relative to the motor assembly support bracket 312.

As the lift actuator 228 moves to the retracted position 234, as shown in FIG. 9B, the actuator rod 292 causes the actuator support bracket 286 to pivot away from the second cross-member 238 which causes the cartridge housing 254 to move towards the first cross-member 236 and towards the crank shaft 240. As the cartridge housing 254 moves toward the crank shaft 240, the guide plate 268 engages the enlarged head of the piston rod 252 pivotally connected to the crank 250 which, in turn, causes the crank 250 to rotate the crank shaft 240 and the wheel support frame 242 in a second opposite rotational direction, which causes the motor assembly housing 304 and the auxiliary wheel 218 to move to the stowed position 224.

Referring to FIGS. 10A-10C, with the with the auxiliary wheel assembly 214 in the deployed position 222, as the patient transport apparatus 20 travels over uneven floor surfaces, the compression spring 256 provides suspension functions for the auxiliary wheel assembly 214 by acting between the cartridge housing 254 and the piston rod 252.

The guide ring 278 moves within the guide slot 282 to enable the piston rod 252 and compression spring 256 to move with respect to the cartridge housing 254 which, in turn, allows for a rotation of the crank shaft 240 to enable movement of the auxiliary wheel 218 in the vertical direction. By enabling the auxiliary wheel 218 to travel vertically with respect to the support frame 212 with the auxiliary wheel assembly 214 in the deployed position 222, the spring cartridge assembly 230 facilitates maintaining sufficient traction between an uneven floor surface 220 and the auxiliary wheel 218 to enable the auxiliary wheel 218 to influence motion of the patient transport apparatus 20 during operation.

For example, as shown in FIGS. 10A and 10B, as the patient transport apparatus 20 transitions from a flat surface to an inclined floor surface, the spring cartridge assembly 230 allows the auxiliary wheel 218 to move towards the support frame 212. As the downward force imparted on the auxiliary wheel 218 by the patient transport apparatus 20 increases, the crank shaft 240 rotates to move the enlarged head of the piston rod 252 away from the cartridge housing 254. The guide ring 278 then moves towards the guide plate 268 compressing the compression spring 256 against the guide plate 268, allowing the compression spring 256 to absorb the downward force of the weight of the patient transport apparatus 20.

Referring to FIGS. 10A and 10C, as the patient transport apparatus 20 transitions from a flat surface to a declined floor surface, the spring cartridge assembly 230 biases the auxiliary wheel 218 away from the support frame 212. As the downward force of the patient transport apparatus 20 decreases, the compression spring 256 expands to move the guide ring 278 away from the guide plate 268 which causes the crank shaft 240 to rotate in the opposite direction to move the auxiliary wheel 218 away from the support frame 212 to remain in contact with the declining floor surface.

Although an exemplary embodiment of an auxiliary wheel assembly 214 is described above and shown in the figures, it should be appreciated that other configurations employing a lift actuator 228 to move the auxiliary wheel 218 between the retracted position 234 and deployed position 222 are contemplated. A control system and associated controller, one or more user input devices, and one or more sensors, may be employed to control operation of the lift actuator 228 and the auxiliary wheel drive system 298, in the manner described in U.S. patent application Ser. No. 16/222,506, hereby incorporated herein by reference.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:

a support structure arranged for movement along a floor surface;

a support wheel coupled to the support structure, with the support wheel being swivelable about a swivel axis; and an auxiliary wheel system including:

a support frame coupled to the support structure and including a first cross-member and a second cross-member spaced a distance from the first cross-member along a longitudinal axis;

an auxiliary wheel assembly coupled to the support frame and positionable between a deployed position engaging the floor surface and a stowed position spaced [[a]] from the floor surface, the auxiliary wheel assembly including:

an auxiliary wheel configured to influence motion of the patient transport apparatus over a floor surface, a motor assembly coupled to the auxiliary wheel and having a motor assembly housing and a motor positioned within the motor assembly housing and coupled to the auxiliary wheel for providing motive power to the auxiliary wheel, a crank shaft rotatably coupled to the first cross-member of the support frame, and a wheel support frame extending radially outwardly from the crank shaft and coupled to the auxiliary wheel such that a rotation of the crank shaft causes a vertical movement of the auxiliary wheel; and an actuator assembly coupled to the support frame and to the auxiliary wheel, the actuator assembly including:

a lift actuator operable to move the auxiliary wheel to the deployed position and to the stowed position; and a spring cartridge assembly configured to bias the auxiliary wheel towards the deployed position.

2. The patient transport apparatus of claim 1, wherein the spring cartridge assembly is configured to allow vertical movement of auxiliary wheel with respect to the support frame with the auxiliary wheel assembly in the deployed position.

3. The patient transport apparatus of claim 1, wherein the spring cartridge assembly is coupled between the lift actuator and the auxiliary wheel for transferring a force from the lift actuator to the auxiliary wheel to facilitate moving the auxiliary wheel to the deployed position and to the stowed position.

4. The patient transport apparatus of claim 3, wherein the lift actuator is positionable between an extended position and a retracted position.

5. The patient transport apparatus of claim 4, wherein the lift actuator is movable towards the extended position to cause the spring cartridge assembly to move the auxiliary wheel towards the deployed position, and wherein the lift actuator is movable towards the retracted position to cause the spring cartridge assembly to move the auxiliary wheel towards the stowed position.

6. The patient transport apparatus of claim 5, wherein the spring cartridge assembly is configured to allow vertical movement of the auxiliary wheel with the lift actuator in the extended position.

7. The patient transport apparatus of claim 1, wherein the motor assembly includes a gear train assembly coupled to the motor and the auxiliary wheel for transferring torque from the motor to the auxiliary wheel.

8. The patient transport apparatus of claim 1, wherein the support structure includes a forward support member, a rear support member, a pair of opposing side support members extending between the forward support member and the rear support member and orientated along the longitudinal axis; and wherein each of the first and second cross-members is coupled between the pair of opposing side support members.

9. A patient transport apparatus comprising:

a support structure arranged for movement along a floor surface;

a support wheel coupled to the support structure, with the support wheel being swivelable about a swivel axis; and an auxiliary wheel system including:

a support frame coupled to the support structure;

an auxiliary wheel assembly coupled to the support frame and positionable between a deployed position engaging the floor surface and a stowed position spaced from the floor surface, the auxiliary wheel assembly including:

an auxiliary wheel configured to influence motion of the patient transport apparatus over a floor surface, a motor assembly coupled to the auxiliary wheel and having a motor assembly housing and a motor positioned within the motor assembly housing and coupled to the auxiliary wheel for providing motive power to the auxiliary wheel, a crank shaft rotatably coupled to the support frame, and a wheel support frame extending radially outwardly from the crank shaft and coupled to the auxiliary wheel such that a rotation of the crank shaft causes a vertical movement of the auxiliary wheel; and an actuator assembly coupled to the support frame and to the auxiliary wheel assembly, the actuator assembly including:

a spring cartridge assembly configured rotate the crank shaft to bias the auxiliary wheel towards the deployed position; and a lift actuator operable to move the spring cartridge assembly to rotate the crank shaft and wheel support frame to move the auxiliary wheel to the deployed position and to the stowed position.

10. The patient transport apparatus of claim 1, wherein the auxiliary wheel assembly includes a crank extending radially outwardly from the crank shaft and coupled to the spring cartridge assembly such that a movement of the spring cartridge assembly causes a rotation of the crank shaft.

11. The patient transport apparatus of claim 10, wherein the spring cartridge assembly includes:

a cartridge housing including a guide plate, the guide plate including a rod opening defined therethrough;

a piston rod at least partially positioned within the cartridge housing, the piston rod extending between a first rod end and a second rod end, the second rod end extending through the rod opening; and a compression spring acting between the piston rod and the cartridge housing for biasing the cartridge housing towards the first rod end.

12. The patient transport apparatus of claim 11, wherein the spring cartridge assembly includes a guide assembly coupled to the piston rod and engaging the compression spring.

13. The patient transport apparatus of claim 12, wherein the cartridge housing includes a sidewall and a guide slot extending through the sidewall; and wherein the guide assembly includes a guide ring that includes a positioning flange inserted through the guide slot to support the piston rod from the cartridge housing.

14. The patient transport apparatus of claim 13, wherein the guide slot is configured to allow a movement of the piston rod with respect to the cartridge housing with the lift actuator in an extended position.

15. The patient transport apparatus of claim 13, wherein the guide assembly includes an adjustment member that is coupled to the piston rod for adjusting an operating length of the compression spring to adjust a load imparted by the compression spring;

wherein the piston rod includes an outer surface having a threaded portion, the adjustment member including a tensioning nut threadably coupled to piston rod, wherein a rotation of the tensioning nut with respect to the piston rod adjusts the operating length of the compression spring; and wherein a rotation of the tensioning nut in a first rotational direction moves the tensioning nut along the piston rod in a first linear direction to decrease the operating length of the compression spring to increase biasing force of the compression spring, and wherein a rotation of the tensioning nut in a second opposite rotational direction moves the tensioning nut along the piston rod in a second opposite linear direction to increase the operating length of the compression spring to reduce biasing force of the compression spring.

16. The patient transport apparatus of claim 11, wherein the piston rod is pivotably coupled to the crank and the cartridge housing is coupled to the lift actuator; and wherein the actuator assembly includes an actuator support bracket pivotably coupled to the second cross-member, the cartridge housing being pivotably coupled to the actuator support bracket.

17. The patient transport apparatus of claim 16, wherein the lift actuator is coupled to the actuator support bracket such that a movement of the lift actuator causes a movement of the actuator support bracket and the cartridge housing; and wherein the lift actuator includes an actuator housing and an actuator rod, the actuator rod being movable between an extended position and a retracted position.

18. The patient transport apparatus of claim 17, wherein the actuator housing is coupled to the first cross-member and the actuator rod is pivotably coupled to the actuator support bracket; and wherein the support frame includes an actuator support arm extending outwardly from the first cross-member, the actuator support arm coupled to the actuator housing to support the actuator housing from the first cross-member.

19. The patient transport apparatus of claim 11, wherein the motor assembly housing includes a body extending between a first housing end and a second housing end, the first housing end pivotably coupled to the wheel support frame, the second housing end being pivotably coupled to the second cross-member;

wherein the support frame includes a motor assembly support bracket extending outwardly from the second cross-member, the motor assembly support bracket coupled to the motor assembly housing to support the motor assembly housing from the second cross-member;

and wherein the motor assembly support bracket includes a translation slot extending therethrough, the motor assembly housing being pivotably and moveably coupled to the motor assembly support bracket with a pin extending outwardly from the motor assembly housing and through the translation slot.

* * * * *